United States Patent
Sahadeo et al.

(10) Patent No.: US 8,479,787 B1
(45) Date of Patent: Jul. 9, 2013

(54) MOTOR VEHICLE SNOW AND ICE COVER WITH HAND GRIPS

(76) Inventors: Lakeram Sahadeo, Tobyhanna, PA (US); George F. Mesiha, Rutherford, NJ (US)

( * ) Notice: Subject to any disclaimer, the term of this patent is extended or adjusted under 35 U.S.C. 154(b) by 319 days.

(21) Appl. No.: 12/910,602

(22) Filed: Oct. 22, 2010

(51) Int. Cl.
*A45D 42/14* (2006.01)

(52) U.S. Cl.
USPC ........ 150/154; 150/166; 150/168; 248/205.8; 296/97.7; 160/370.21

(58) Field of Classification Search
USPC .............. 150/154, 166, 168; 160/370.21, 160/368.1, 327; 248/205.8; 296/136.01, 136.02, 296/136.07, 136.08, 136.1, 95.1, 97.7, 97.8; 383/76, 4, 25, 109, 10
See application file for complete search history.

(56) References Cited

U.S. PATENT DOCUMENTS

| | | | |
|---|---|---|---|
| 2,751,977 A | 6/1956 | Pinkerton | |
| 2,801,667 A | 8/1957 | Curran | |
| 3,338,293 A * | 8/1967 | Hohmann | 160/370.21 |
| 4,184,501 A | 1/1980 | Johnson | |
| 4,867,216 A | 9/1989 | McKee | |
| 4,951,993 A | 8/1990 | Taboada | |
| 5,368,912 A * | 11/1994 | Reaves | 428/192 |
| 5,413,396 A | 5/1995 | Poznansky et al. | |
| 5,597,197 A | 1/1997 | Mowar et al. | |
| 6,439,644 B1 | 8/2002 | Jester | |
| 6,779,827 B2 | 8/2004 | Clark | |
| 2001/0028561 A1 * | 10/2001 | Pitts | 362/84 |
| 2011/0140478 A1 * | 6/2011 | Devereaux | 296/136.02 |

FOREIGN PATENT DOCUMENTS

| | | |
|---|---|---|
| CN | 201179828 | 1/2009 |
| DE | 3727506 | 3/1989 |
| WO | WO95/21065 | 8/1995 |

* cited by examiner

*Primary Examiner* — Anthony Stashick
*Assistant Examiner* — Cynthia Collado
(74) *Attorney, Agent, or Firm* — Michael I. Kroll

(57) ABSTRACT

A vehicle cover having a plurality of handles with tethers disposed along its longitudinal meridian for easy manipulation of said handles and attached cover so as to lift the cover and dislodge accumulated snow and/or ice. Additionally the present invention has a plurality of fastening clips for increased sustainment of the covers positioning against wind and environmental elements.

18 Claims, 12 Drawing Sheets

MOTOR VEHICLE SNOW AND ICE COVER WITH HAND GRIPS

BACKGROUND OF THE INVENTION

1. Field of the Invention

The present invention relates generally to vehicle covers and, more specifically, to a device for covering a vehicle from the fall of snow and/or ice, comprising a flexible impermeable sheet of material, such as plastic or other material, having a plurality of handles with tethers disposed across in intervals along the central lengthwise meridian of said substantially rectangular flexible impermeable sheet. Additionally disposed along its periphery is an elastic band and a plurality of spaced fasteners to secure the cover to the sides of the vehicle in order to encase the entire exposed outside of the vehicle from the elements. A secondary elastic band that encompasses the roof and windows and extends between the hood and trunk is provided to relieve strain on the cover while pulling on the handles, which allows the user to easily pull up the cover's flexible impermeable sheet after snow and/or ice has covered it creating a slope whereby the accumulated frozen precipitation simply slides off of the flexible impermeable sheet.

2. Description of the Prior Art

There are other vehicle cover devices designed for protection of a vehicle. Typical of these is U.S. Pat. No. 2,751,977 issued to Pinkerton on Jun. 26, 1956

Another patent was issued to U.S. Pat. No. 2,801,667 on Aug. 6, 1957 as U.S. Pat. No. 2,801,667. Yet another U.S. Pat. No. 4,184,501 was issued to Johnson on Jan. 22, 1980 and still yet another was issued on Sep. 19, 1989 to McKee as U.S. Pat. No. 4,867,216.

Another patent was issued to Tahoada on Aug. 28, 1990 as U.S. Pat. No. 4,951,993. Yet another U.S. Pat. No. 5,413,396 was issued to Poznansky et al. on May 9, 1995. Another was issued to Mower et al. on Jan. 28, 197 as U.S. Pat. No. 5,597,197 and still yet another was issued on Aug. 24, 2004 to Clark as U.S. Pat. No. 6,779,827.

Another patent was issued to Lehnhoff on Mar. 2, 1989 as German Patent No. DE3727508. Yet another PCT Patent No. WO9521065 was issued to Bock on Feb. 4, 1994. Another was issued to Shiping on Jan. 14, 2009 as Chinese Patent No. CN201179828.

U.S. Pat. No. 2,751,077

Inventor: D. F. Pinkerton

Issued: Jun. 26, 1956

A protection for automobiles comprising flexible cover having transverse and casings with open corner portions, said transverse casings being divided transversely thereof cords slidably threaded through said casings and formed into projection loops at the exposed corner portions of the cover, the ends of the cords projecting from the division points of the transverse casings and being accessible for trying and elastic members provided on said loops.

U.S. Pat. No. 2,801,667

Inventor: E. J. Curran

Issued: Aug. 6, 1957

A protective covering for vehicles comprising a flexible body of a size sufficient to overlie the major portion of the area of an automobile, loops projection beyond opposite ends of said body, side flexible elements connected to loops and extending along opposite sides of the body, and handles projecting laterally outwardly from the body, and handles projecting laterally outwardly from the body and connected to said elements, said handles constituting extensions of the side elements, the side elements having connections at one end to the respective loops and the handles being formed at the other ends of the side elements, there being two handles at each side of the covering spaced closely apart longitudinally of the covering and free of connections to one another, said loops being generally U-shaped and being adapted to engage under bumper guards of the vehicle at opposite ends of the vehicle, there being two loops at each end of the body with each loop of an end being adapted for engagement under a single bumper guard.

U.S. Pat. No. 4,184,501

Inventor: Bernard I. Johnson

Issued: Jan. 22, 1980

A tool for removing and replacing wing valves or master valves on an operating wellhead under pressure includes an elongated housing with a fluid coupling on one end for connecting to the outlet end of a wellhead valve and a packing assembly extending from the housing through the valve into the wellhead where it seals fluid flow to the valve. A latch on the packing assembly is used to secure it in the wellhead. The housing is equipped with a manipulator to expand and retract the packing and to engage and release the latch. An auxiliary reaming tool is provided for mounting with the manipulator and inserting through the valve to smooth the bore of a wellhead conduit if necessary prior to inserting the packing assembly into the conduit.

U.S. Pat. No. 4,867,216

Inventor: John P. Mckee

Issued: Sep. 19, 1989

A cover for covering a selected exterior portion of a vehicle is disclosed. The cover includes at least one layer of flexible material having a relatively even surface with a plurality of raised portions projecting outwardly from the surface. The raised portions are sized and spaced from each other to prevent the layer of flexible material from collapsing between the raised portions. The raised portions are also sized and spaced to prevent non-pooled liquid water lying on the surface of the vehicle from making contact with the even surface of the cover. As such, non-pooled water lying on the vehicle's surface is incapable of sticking to the even surface when it freezes. Accordingly, the only portions of the cover capable of freezing and sticking to the vehicle's surface are the raised portions. Thus, the cover is easy to pull off the car even when its raised portions are frozen to the car.

U.S. Pat. No. 4,951,993

Inventor: Vincent C. Tahoada

Issued: Aug. 28, 1990

A reversibly expandable vehicle cover is a generally rectangular cover body which is folded along transverse folding scores into an accordion pleated hinged series of panels terminating in front and end panels. Extending slidably through receiving openings in the panels and extending beyond the front and rear end panels are adjustable length elastomeric guide cords that fasten at the front and rear ends of the cover body with end panel cords that are themselves fastened by one end to the front and rear end panels of the cover body. Upon extending the cover over the vehicle, the cover is secured to the front and rear ends of the vehicle by couplers associated with the termini of the cords.

U.S. Pat. No. 5,413,396

Inventor: Vlad Poxnansky

Issued: May 9, 1995

A protective cover for a motor vehicle, particularly for a motorcar, in the form of a strip of a length commensurate with the length of the motorcar and of a width slightly smaller than the width of the baggage compartment of the motorcar. The cover includes a number of stiff rectangular panels connected along their long sides by flexible joints, which permits the cover to be folded into a close stack, to be stored inside the baggage compartment of the motorcar and to be pulled out and to be stretched over the body of the motorcar. The strip is provided with a mechanism for attaching its near end to the inside of the baggage compartment and a mechanism for attaching its far end to the front of the motorcar. The cover further includes two lengths of strip or string having their two ends attached to points proximate two corners of each pair of panels, the strip being of a length commensurate with the distance between the points on the panels in the fully stretched state of the cover. The cover further includes elastic members connecting the centers of each two lengths of strip or string adapted to pull the two strips or strings towards the center line of the cover and thereby pull each pair of panels into mutual contact and all the panels of the cover into a close stack.

U.S. Pat. No. 5,597,197

Inventor: Zeev Mower

Issued: Jan. 28, 1997

An automobile sunshade cover shades a passenger compartment of an automobile. The sunshade is attached at one end to a pouch for storing the cover, and is arranged so that the pouch is freely suspended by laces from suitable fittings of the automobile, such as the hinges attaching the lid of the trunk to the automobile body. The pouch serves to anchor the sunshade when deployed. The sunshade has a crossbar attached to its front edge which provides a convenient grip for the user during the deployment and folding back of the cover, while acting as a second anchor of the cover when placed under the windshield wipers. In its operative position, the sunshade covers all the automobile's windows providing protection against the sun regardless of the time of day that the sunshade is deployed or the orientation of the parked vehicle. The sunshade does not cover the automobile's registration plates or rear reflectors. It is conveniently and unobtrusively stored away in the trunk when not in use to overcome the disadvantages of regular sunblinds, which typically obstruct a driver's field of view or clutter up an automobile's interior.

U.S. Pat. No. 6,339,644

Inventor: Shaun P. Jester

Issued: Aug. 27, 2002

The present invention discloses a device for a cover on a vehicle, group of vehicles or building whereby the vehicles are protected from falling hail during a hail storm. The present invention comprises a flexible cover having an air blower for constantly supplying air to the cover along with spring-loaded outlet air valves whereby a preset pressure is maintained in the cover. The cover operates somewhat on the principle of a hovercraft according to dynamic physics. An air blower is also provided along with straps for holding the cover onto the vehicle.

U.S. Pat. No. 6,779,827

Inventor: Garry E. Clark

Issued: Aug. 24, 2004

An automobile cover apparatus and system is described. The automobile cover generally includes a main cover body having a hood end, a trunk end, an upper surface and a lower surface, connectors located on the hood end and the trunk end, trunk cords connected to the connectors on the trunk end, a trunk anchor connected to the trunk cords on ends of the trunk cords opposite the ends connected to the connectors, hood cords connected to the connectors on the hood end and a hood connection device connected to each of the hood cords opposite the ends connected to the connectors. The cover can be combined with a winder for a automobile cover kit.

German Patent Number DE3727506

Inventor: Kurt Lehnhoff

Issued: Mar. 2, 1989

Cover device for covering the windscreen of a parked motor vehicle in order to protect the windscreen against the accumulation of snow and/or ice. For this purpose, a cover panel (1) is equipped at the corner points with suction caps (2)-(5) which make it possible to attach the cover device to the windscreen.

International Patent Application Publication No. WO9521065

Inventor: Robert Back

Issued: Aug. 10, 1995

A cover device (1) for motor vehicle windows and/or lights comprising an external shell (2) which has an inner region (3) and at least two end regions (4). The cover device also comprises at least two handles (6), wherein each of the two handles is connected to the external shell at a perimeter region of each of the at least two end regions. The end regions of the external shell is closable inside a motor vehicle passenger compartment. The cover device protects a motor vehicle windows and/or lights from snow, ice, freezing rain, dirt, dust, debris, or other foreign matter. The cover device can be used on a windshield, a rear window, side windows and lights of a motor vehicle so as to provide for an easy clearing and cleaning of same . . . .

China Patent Number CN201179828

Inventor: Shi Shiping

Issued: Jan. 14, 2009

The utility model provides a convenient vehicle cover which can resist frost, snow and sunshine. The vehicle cover adopts Oxford or plastic cloth with silver coating or other cloth with the similar function and consists of five connected sides: a front side, a back side, a left side, a right side and a top side, which enables the cover to cover the surrounding glass of the whole vehicle and the top of the vehicle; and both sides of the front of the cover are respectively provided with a connecting structure connected with a left rear view mirror and a right rear view mirror in the front of the vehicle. The cover is made of reflective materials, can effectively cover the vehicle windows and the top of the vehicle, can resist the sunshine in summer and the frost in autumn and the snow in winter. The cover can be opened by just one person and is very convenient to use.

While these covering devices may be suitable for the purposes for which they were designed, they would not be as suitable for the purposes of the present invention, as hereinafter described.

SUMMARY OF THE PRESENT INVENTION

A primary object of the present invention is to provide a vehicle cover having a plurality of handles for lifting said cover along its longitudinal meridian and dislodging snow and/or ice precipitated on top and sides.

Another object of the present invention is to provide a vehicle cover having a plurality of handles with tethers for easy manual manipulation of the covers positioning from central locations.

Yet another object of the present invention is to provide a vehicle cover having a plurality of handles on the top and fastening clips along its periphery in order to maintain it's positioning against wind and environmental forces until removal is desired.

Additional objects of the present invention will appear as the description proceeds.

The present invention overcomes the shortcomings of the prior art by providing a vehicle cover having a plurality of handles with tethers disposed along its longitudinal meridian for easy manipulation of said handles and attached cover so as to lift the cover and dislodge accumulated snow and/or ice. Additionally the present invention has a plurality of fastening clips for increased sustainment of the covers positioning against wind and environmental elements.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
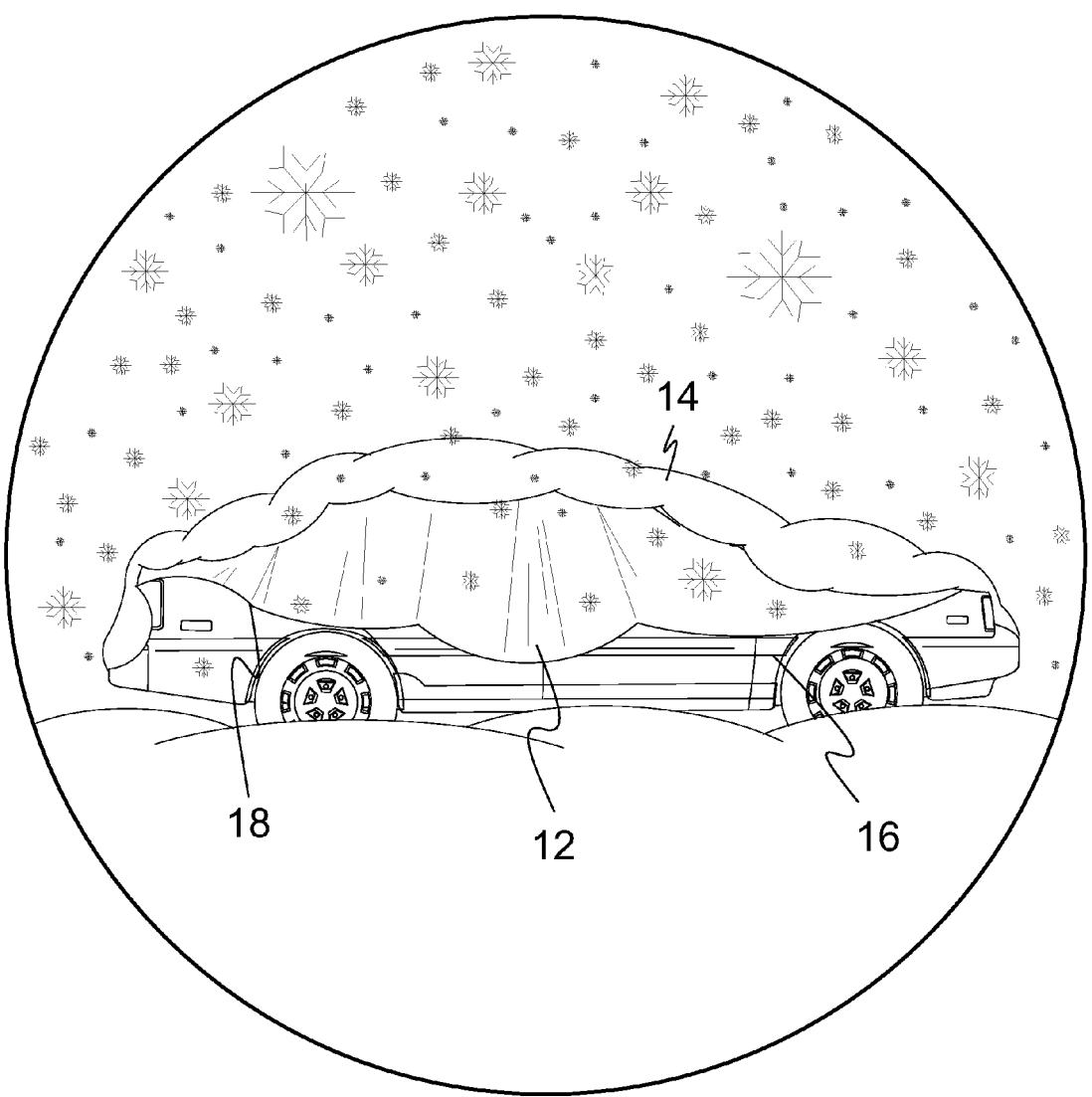
FIG. 1 is an illustrative view of the prior art.

Turning now descriptively to the drawings, in which similar reference characters denote similar elements throughout the several views, the figures illustrate the Protective Snow and Ice Cover with Handgrips for Motor Vehicles of the present invention. With regard to the reference numerals used, the following numbering is used throughout the various drawing figures.

10 Protective Snow and Ice Cover with Handgrips for Motor Vehicles of the present invention
12 prior art
14 snow
16 vehicle
18 peripheral edge of 12
20 flexible impermeable sheet
22 handle
24 ice
26 hand grip
28 tether
30 base of 22
32 fastener element
34 chemiluminescent solution
36 clearance
38 reinforcement layer of material
40 lower elastic
42 upper retainer of 30
44 magnetic lower retainer of 30
46 user
48 storage pouch
50 drawstring
52 reinforced ring
54 vent holes
56 firm rings 58 drain with plug
60 sponge material
62 leg
64 flexible impermeable body of 48
66 upper elastic
68 suction cup

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the prior art 12. Shown is a vehicle having a conventional bad weather cover 12. Snow 14 and ice accumulates over this type of vehicle cover, compressing it to the cover and vehicle 16, making it difficult to remove. Furthermore updrafts and wind get under the peripheral edges 18 and displace the cover 12.

Figure 2:
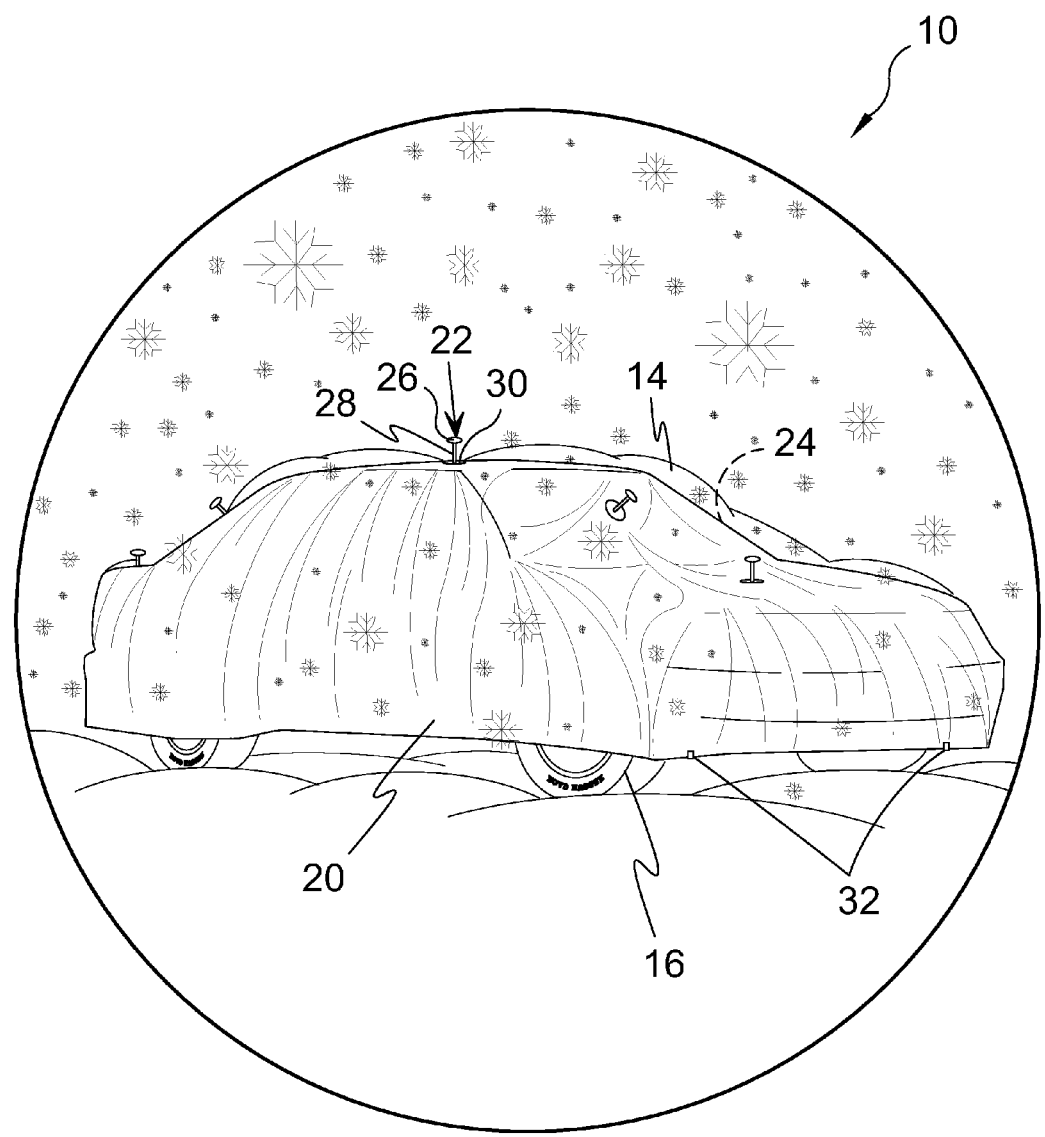
FIG. 2 is an illustrative view of the motor vehicle snow and ice cover of the present invention in use.

FIG. 2 is an illustrative view of the vehicle snow and ice cover 10 of the present invention in use. The present invention is a snow and ice cover 10 for a motor vehicle 16 comprising a flexible impermeable sheet, such as plastic or other material, 20 having handles 22 for removal of the cover after it has been covered by snow 14 and/or ice 24. The handles 22 comprise a hand grip 26 and tether 28 attached to a base 30 secured to the flexible sheet 20. The cover further provides spaced apart peripheral fasteners 32 for anchoring the edges of the flexible impermeable sheet 20 to the vehicle 16.

Figure 3:
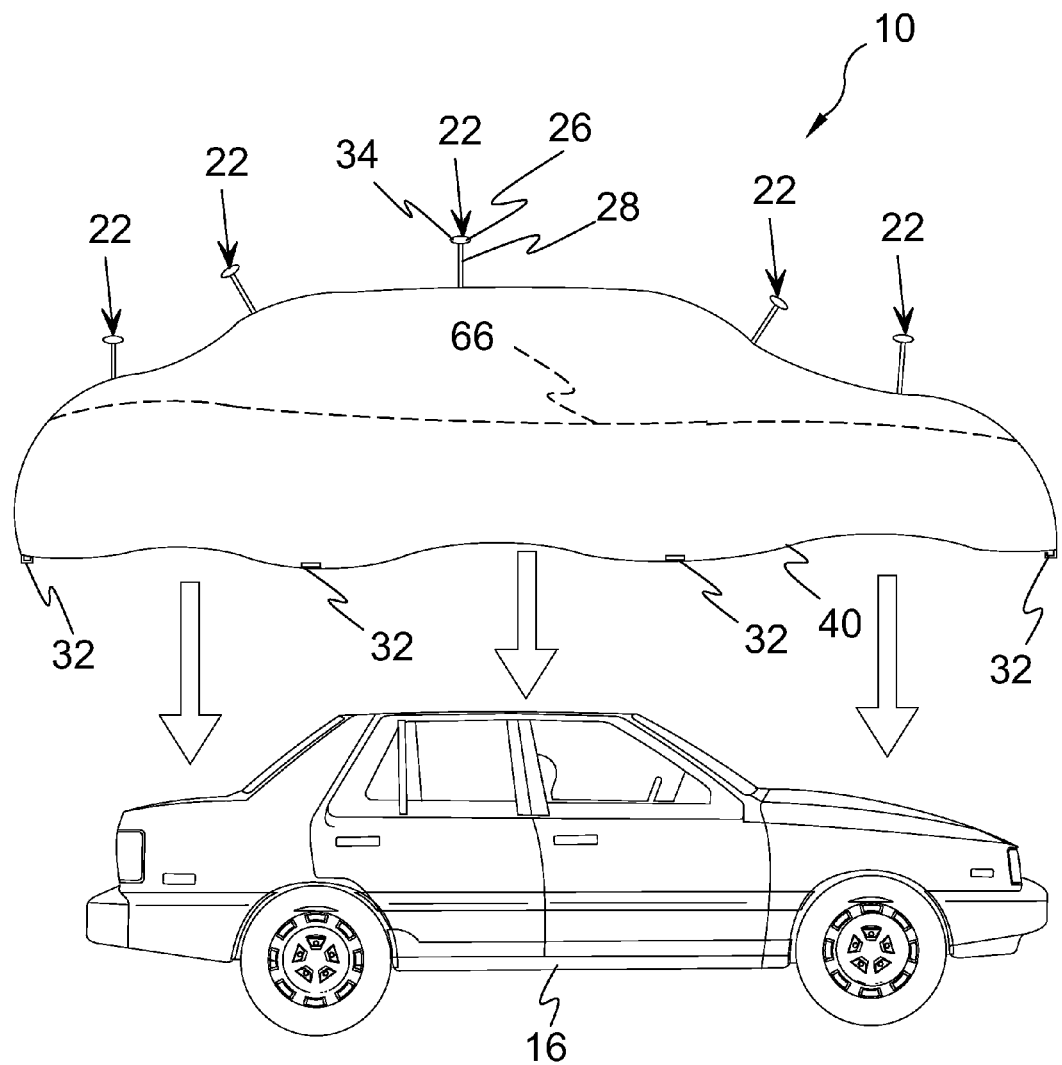
FIG. 3 is a side view of the present invention in use.

FIG. 3 is a side view of the present invention in use. Shown is the motor vehicle snow and ice cover 10 about to be mounted to a vehicle 16. The handles 22 have glow paint or a chemiluminescent element 34 disposed therewith. The semi-rigid, resilient tethers 28 are approximately 12" long. Shown are the fasteners 32 disposed on the rear, front and side of the vehicle 16.

Figure 4:
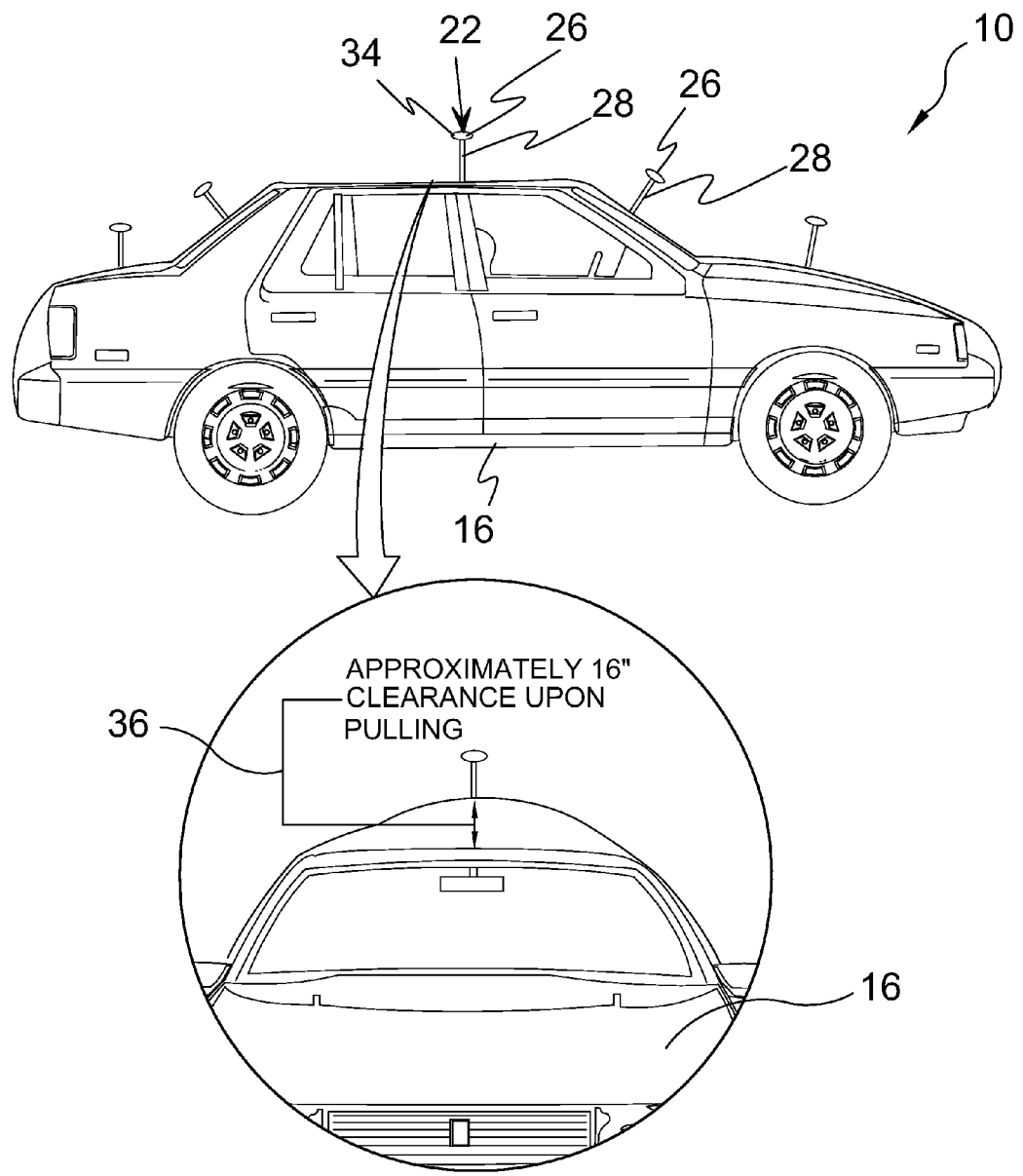
FIG. 4 is a side and front view of the present invention in use.

FIG. 4 is a side and front view of the present invention in use. Shown is the motor vehicle snow and ice cover 10 installed on a vehicle 16 so that the cover can be easily removed by grasping and lifting the hand grip 26 and tether 28 to provide approximately 16" clearance 36 and creating a slope for the snow and/or ice to slide off the cover.

Figure 5:
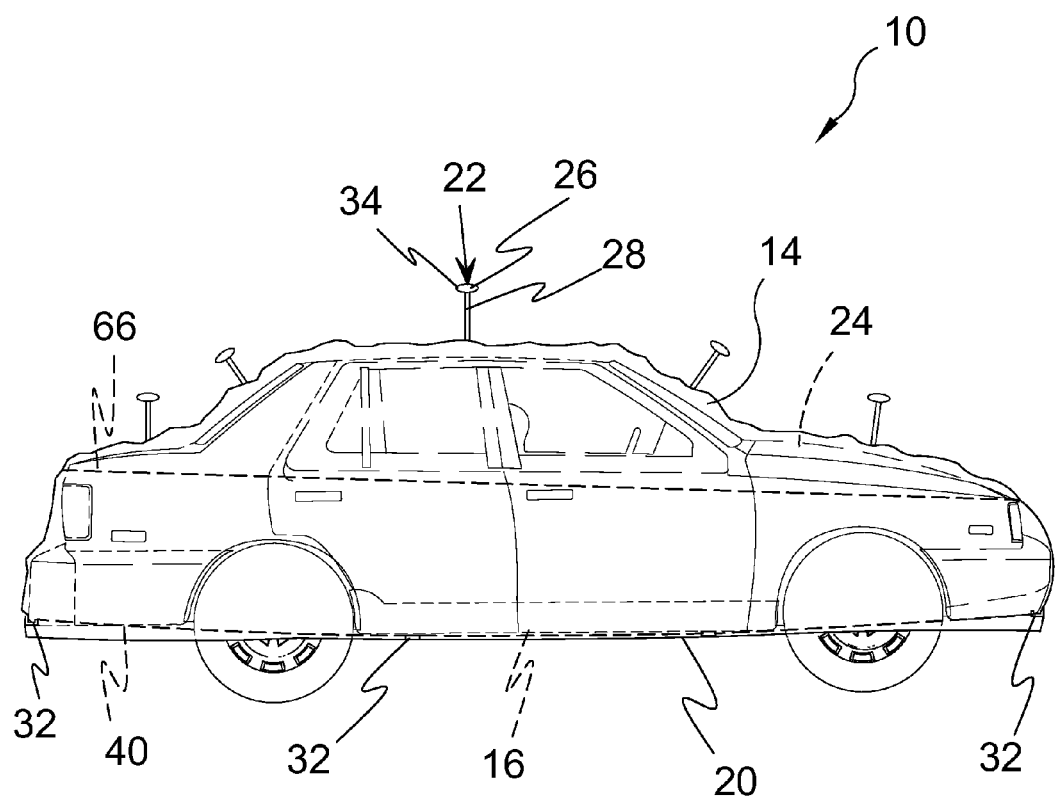
FIG. 5 is a side view of the present invention in use.

FIG. 5 is a side view of the present invention in use. Shown is the snow and ice cover 10 mounted to a vehicle 16 having a flexible impermeable sheet 20 with handles 22 having resilient tethers 28 for removal of the cover after covered by snow 14 and/or ice 24. Spaced apart fasteners 32 anchor the rear, front and sides of the snow and ice cover to a vehicle 16. A lower elastic band 40 keeps the cover snugly fit to the motor vehicle, while an upper elastic band 66 encompasses the roof and windows and extends between the hood and trunk to relieve strain on the cover while pulling on the handles causing the accumulated snow and/or ice to simply slide off of the flexible impermeable sheet.

Figure 6:
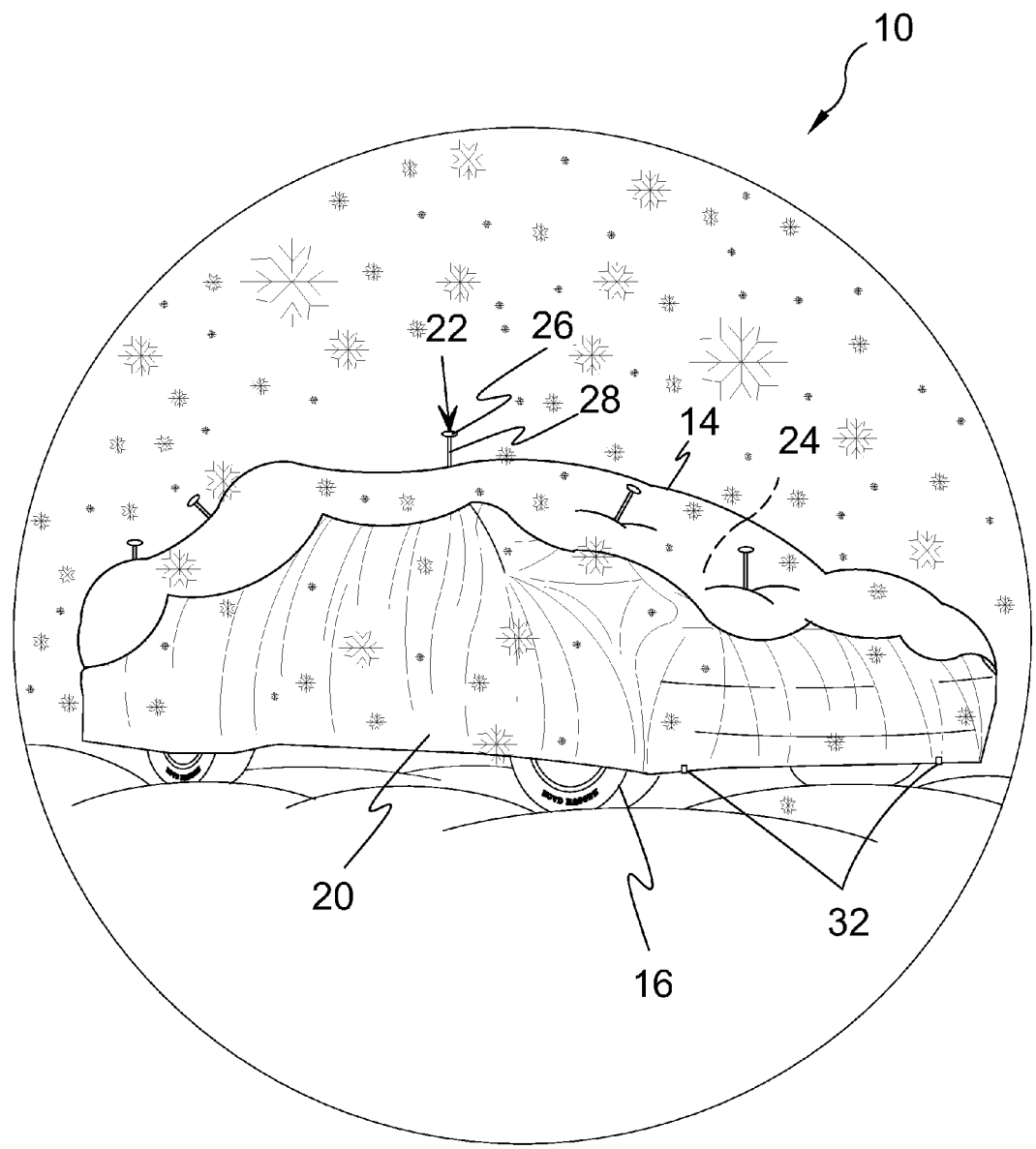
FIG. 6 is an illustrative view of the motor vehicle snow and ice cover of the present invention in use.

FIG. 6 is an illustrative view of the vehicle snow and ice cover of the present invention in use. Shown is the snow and ice cover 10 mounted to a vehicle 16 having a flexible impermeable sheet 20 with handles 22 having resilient tethers 28 protruding above the surface of the snow 14 and/or ice 24 layer. Spaced apart fasteners 32 anchor the snow and ice cover 10 to the vehicle 16.

Figure 7:
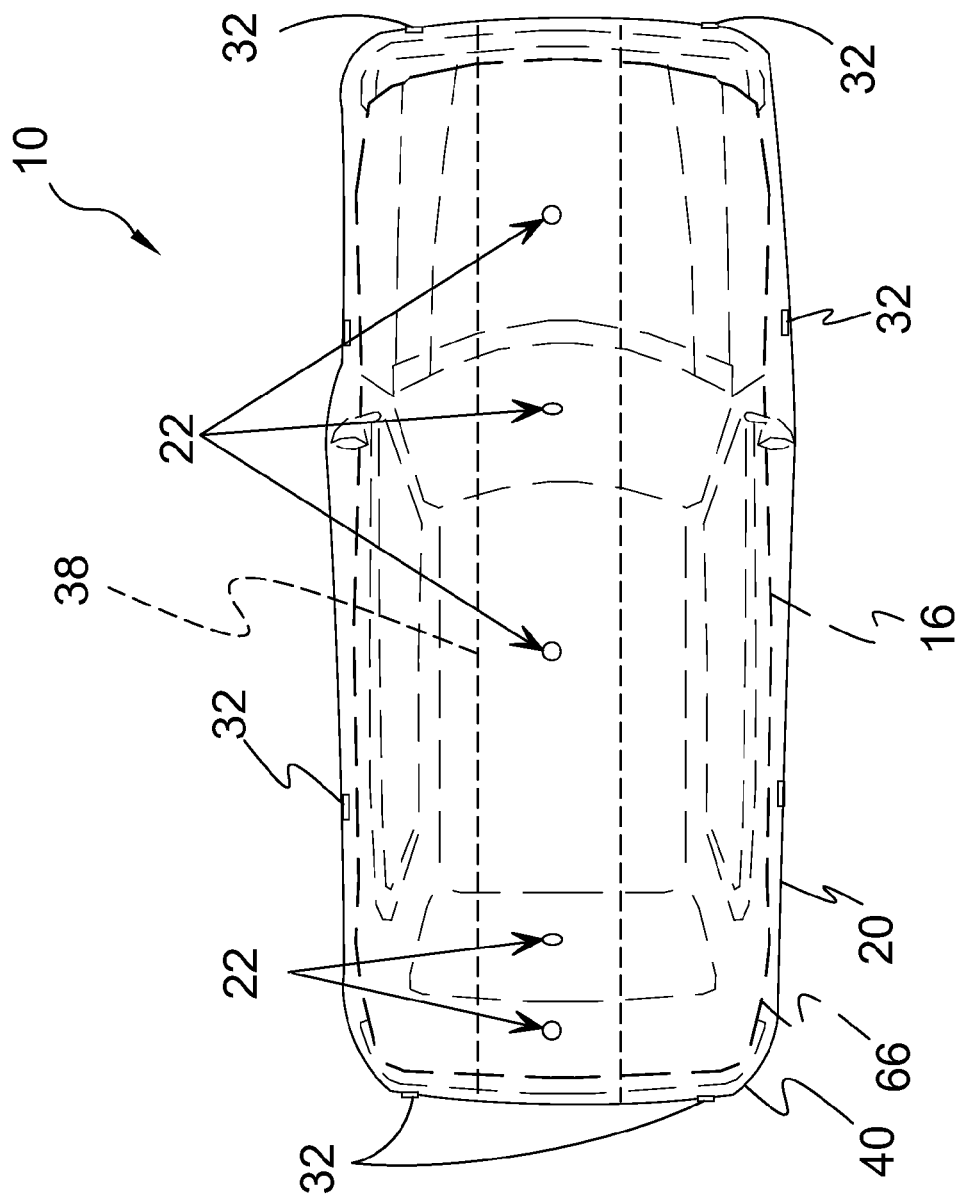
FIG. 7 is a top view of the motor vehicle snow and ice cover of the present invention in use.

FIG. 7 is a top view of the vehicle snow and ice cover of the present invention in use. Shown is the snow and ice cover 10 mounted to a vehicle 16 having a flexible impermeable sheet 20 with handles 22 having resilient tethers 28 for removal of the cover after covered by snow and/or ice. Spaced apart fasteners 32 anchor the rear, front and sides of the snow and ice cover to a vehicle 16. A lower reinforced layer 38 is provided for extra strength. An upper elastic band 66 encompasses the roof and windows and extends between the hood and trunk to relieve strain on the cover while pulling on the handles causing the accumulated snow and/or ice to simply slide off of the flexible impermeable sheet.

Figure 8:
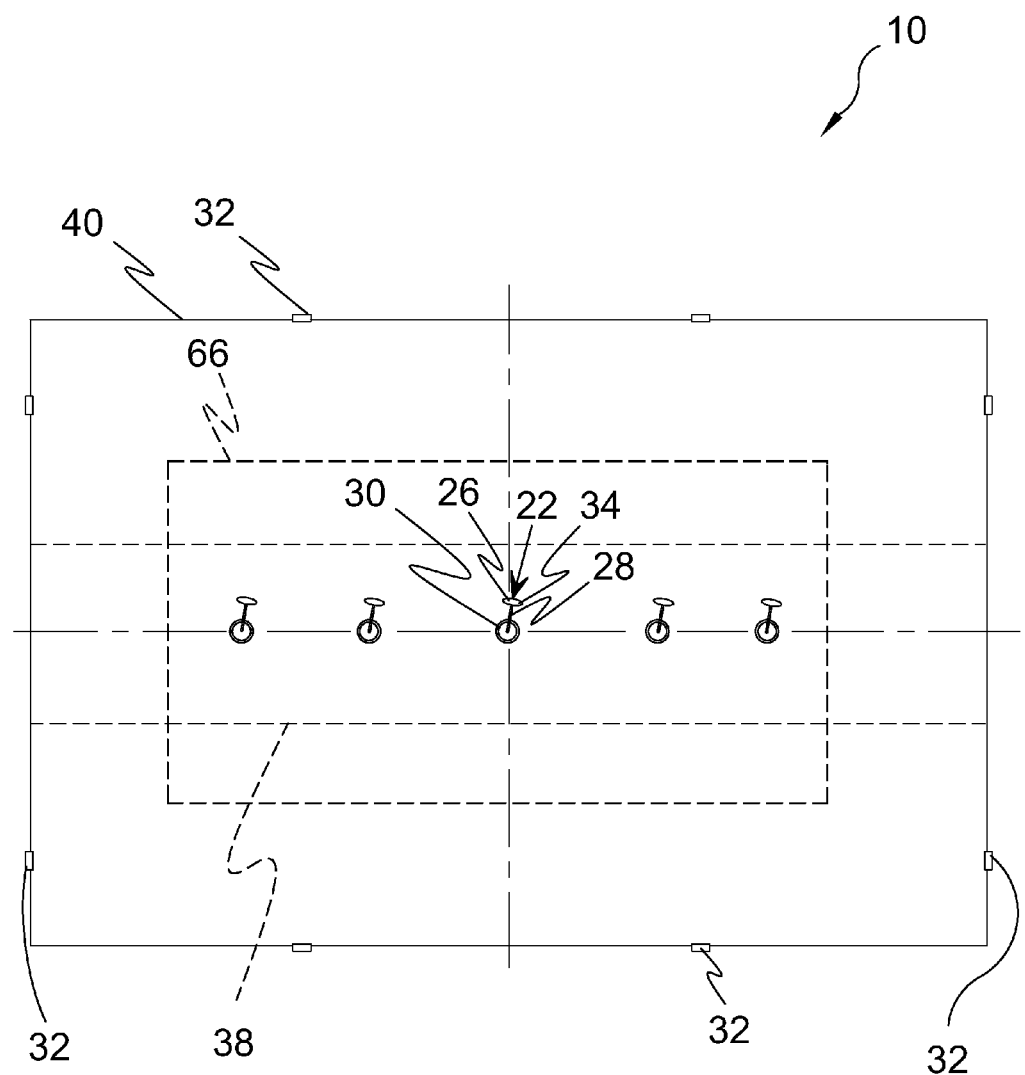
FIG. 8 is a top view of the motor vehicle snow and ice cover of the present invention.

FIG. 8 is a top view of the vehicle snow and ice cover 10 of the present invention. Shown is the snow and ice cover 10 having a flexible impermeable sheet 20 with a plurality of handles 22 with each having a hand grip 26 and a base 30 with a resilient tether 28 disposed therebetween for removal of the cover after covered by snow and/or ice. Spaced apart fasteners 32 anchor the rear, front and sides of the snow and ice cover to a vehicle. A lower reinforced layer 38 is provided for extra strength and lower elastic 40 is peripherally disposed around said flexible impermeable sheet 20 to cooperate with said fasteners 32 to prevent updrafts from entering therein. An upper elastic band 66 encompasses the roof and windows and extends between the hood and trunk to relieve strain on the cover while pulling on the handles causing the accumulated snow and/or ice to simply slide off of the flexible impermeable sheet. Glow paint or a chemiluminescent element 34 covers or is infused in the handle 22 for increased visibility during low light conditions.

Figure 9:
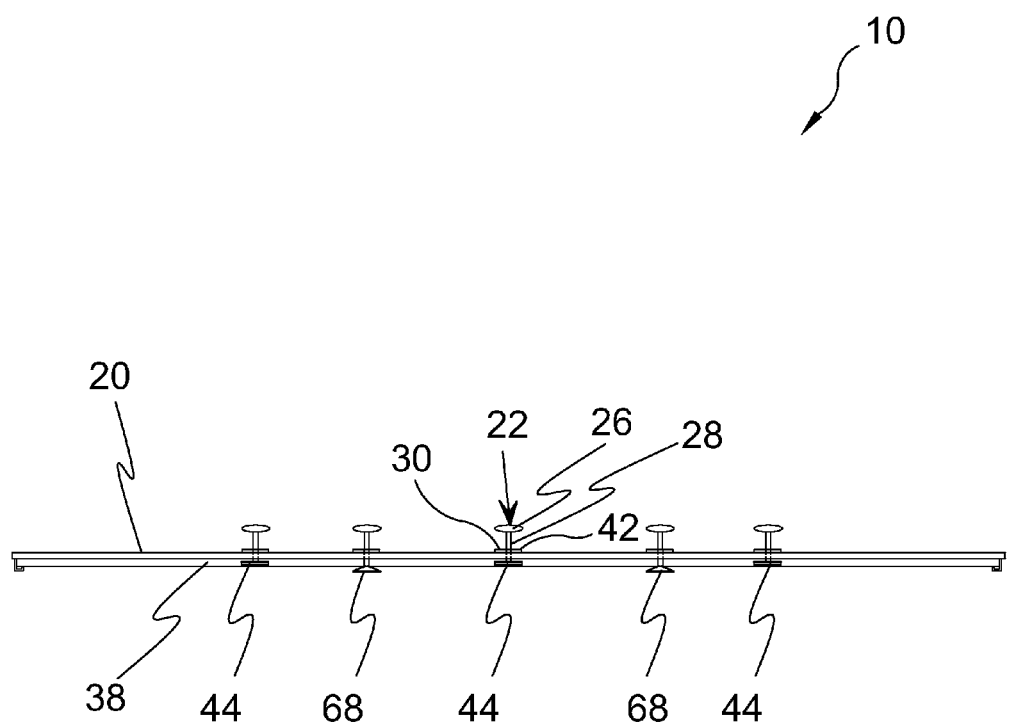
FIG. 9 is a side view of the motor vehicle snow and ice cover of the present invention.

FIG. 9 is a side view of the motor vehicle snow and ice cover 10 of the present invention. Shown is the flexible impermeable sheet 20 with the reinforced layer 38 bonded to the underside thereof. The handles 22 each comprising a handgrip 26, a base 30 and a semi-rigid, resilient tether 28 communicating therebetween. The base 30 comprises an upper retainer member 42 and a magnetic lower retainer member 44 to prevent tearing of the material. The magnetic lower retainers 44 serves to form a magnetic bond between the cover and the vehicle's metal surfaces while the suction cups 68 are used for attachment to the front and rear windows to prevent the casual displacement of the cover in the event that strong winds compromise the elastic and the fasteners.

Figure 10:
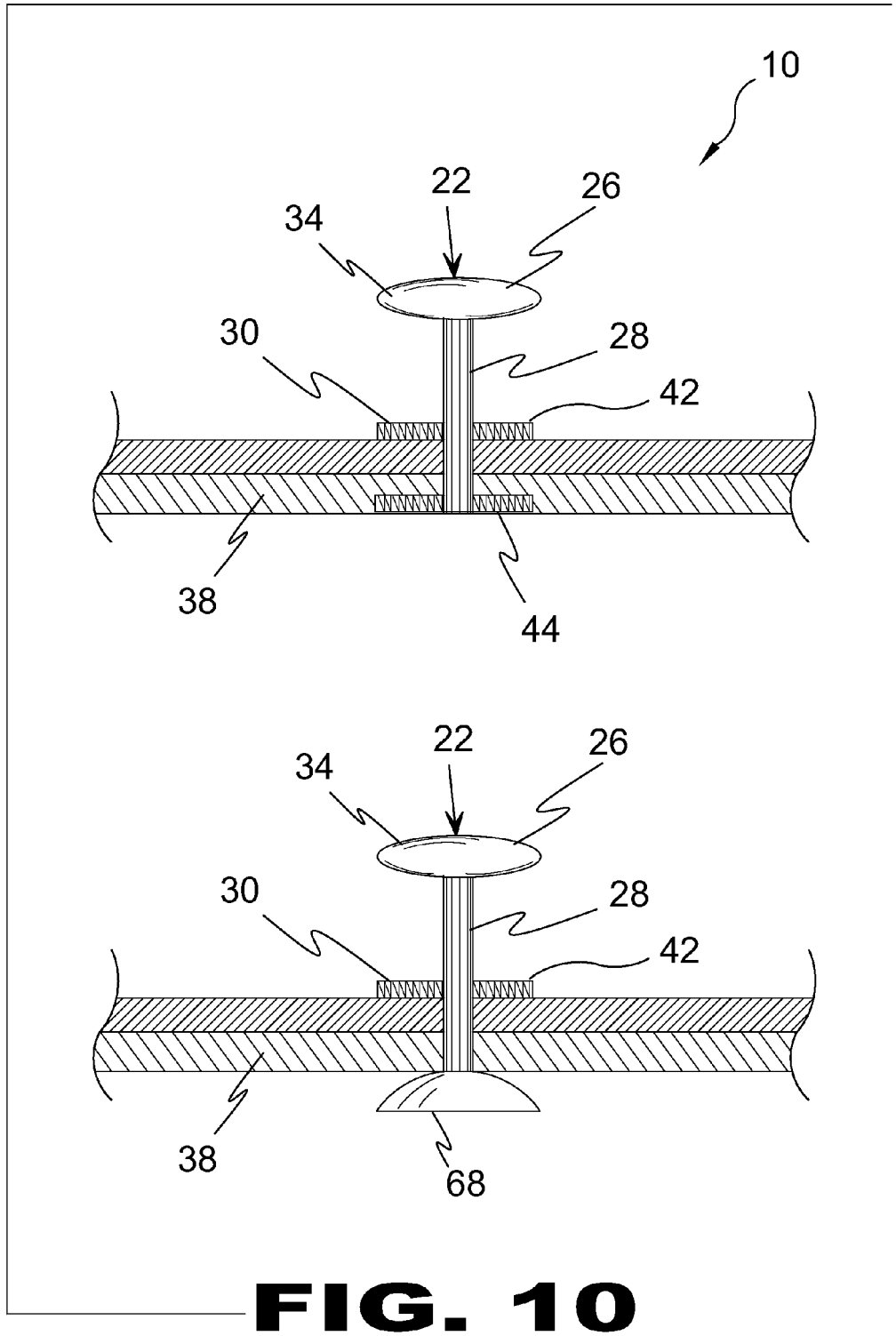
FIG. 10 is a detailed sectional view of the motor vehicle snow and ice cover handle of the present invention.

FIG. 10 is a detailed sectional view of the vehicle snow and ice cover 10 of the present invention. Shown is the flexible impermeable sheet 20 with the reinforced layer 38 bonded to the underside thereof. The handles 22 each comprising a handgrip 26, a base 30 and a semi-rigid, resilient tether 28 communicating therebetween. The base 30 comprises an upper retainer member 42 and either a pliable magnetic lower retainer member 44 or suction cup 68 to prevent tearing of the material. The magnetic lower retainer 44 serves to form a magnetic bond between the cover and the vehicle's metal surfaces while the suction cup 68 is used for attachment to the front and rear windows to prevent the casual displacement of the cover in the event that strong winds compromise the elastic and the fasteners.

Figure 11:
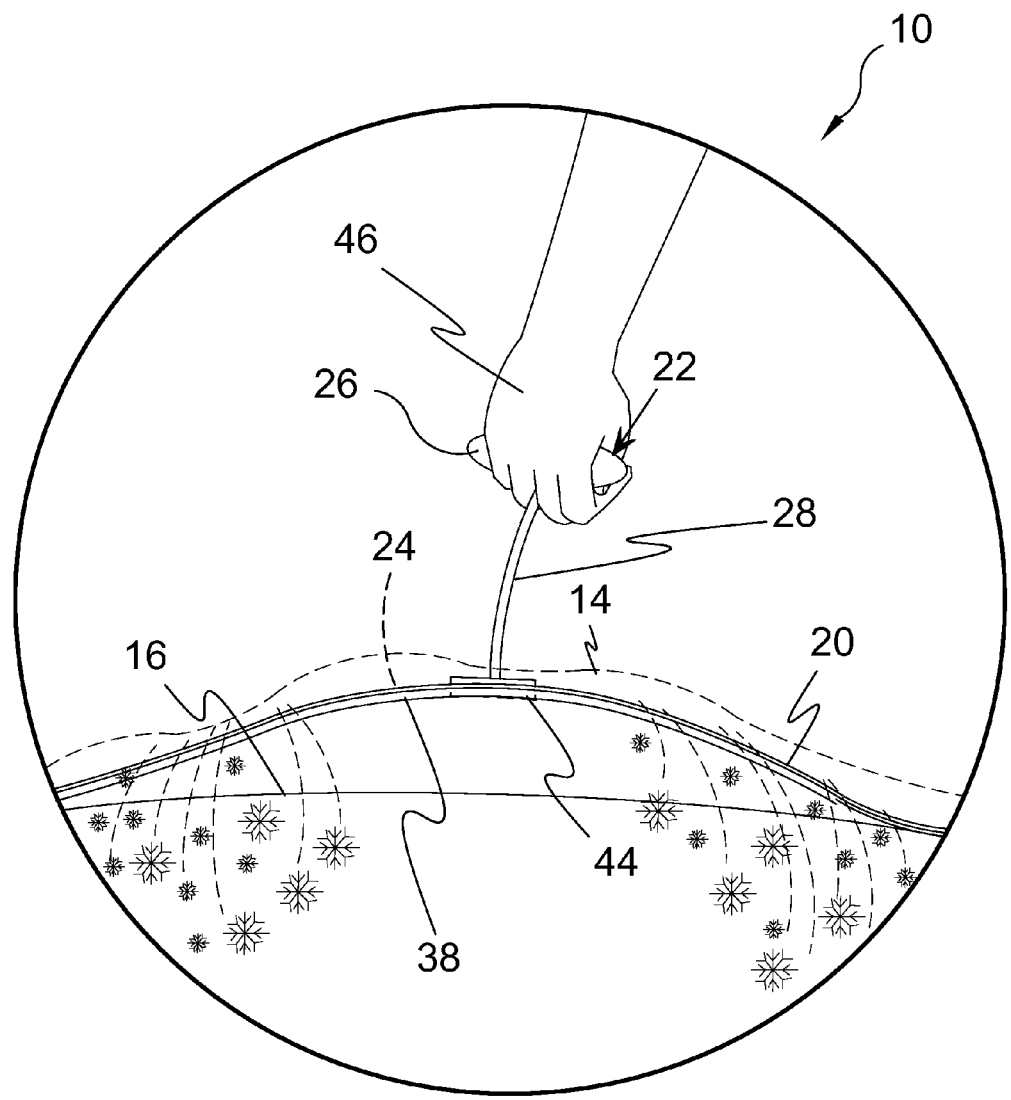
FIG. 11 is an illustrative side view of a motor vehicle snow and ice cover handle of the present invention in use.

FIG. 11 is an illustrative side view of a motor vehicle snow and ice cover 10 of the present invention in use. Shown is a user 46 pulling on the handlegrip 26 of the handle 22 and the tether 28 bending under the applied bias removing the snow and ice from the cover 10 on a vehicle 16 with snow 14 and ice 24 accumulation falling to the side of the vehicle. The upward bias breaks the magnetic bond of the pliable magnetic lower retainer 44 and the suction of the suction cup 68 to the window glass of vehicle 16 and permits the flexible impermeable sheet 20 and associated reinforced layer 38 to be lifted therefrom.

Figure 12:
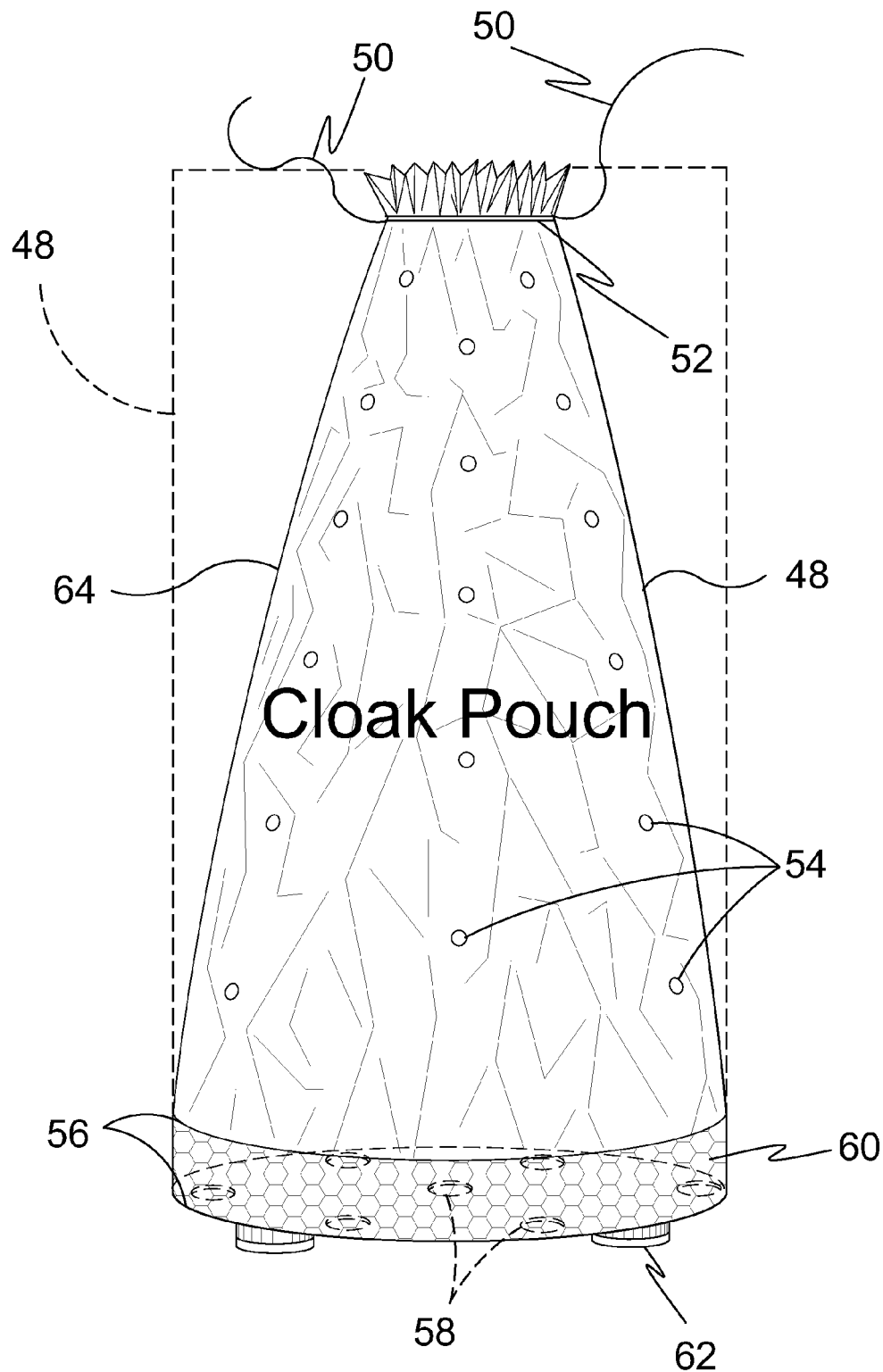
FIG. 12 is an illustrative view of the storage pouch for the motor vehicle snow and ice cover of the present invention.

FIG. 12 is an illustrative view of the storage pouch 48 for the motor vehicle snow and ice cover of the present invention.

Shown is the storage pouch 48 comprising a body 64, a drawstring 50 within a reinforced ring 52, a plurality of vent holes 54, firm rings 56 with sponge material 60 disposed in a lower portion thereof, a plurality of drains with plugs 58 and a plurality of legs 62.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A motor vehicle snow and ice protective cover with handgrips comprising:
    a) a flexible impermeable sheet sized to fit over a motor vehicle;
    b) a plurality of fastener elements disposed peripherally at the edges of said flexible impermeable sheet;
    c) a plurality of handles disposed in spaced apart relation along the longitudinal medial portion of said flexible impermeable sheet; and
    d) a storage pouch comprising:
        1) a body having one open end;
        2) a reinforced ring circumferentially encompassing said open end of said body;
        3) a drawstring disposed within said reinforced ring with the ends thereof of extending therefrom;
        4) a plurality of vent holes disposed within said body;
        5) firm rings disposed at a lower portion of said body;
        6) a sponge material associated with said firm rings;
        7) at least one drain with a plug disposed on a bottom portion of said body; and
        8) a plurality of legs disposed on the underside of said body.

2. The motor vehicle snow and ice protective cover with handgrips as recited in claim 1, wherein each said handle comprises:
    a) a base integral with said flexible impermeable sheet;
    b) a hand grip; and
    c) a tether member communicating between said base and said hand grip.

3. The motor vehicle snow and ice protective cover with handgrips as recited in claim 2, wherein said tether member raises said hand grip above said flexible impermeable sheet.

4. The motor vehicle snow and ice protective cover with handgrips as recited in claim 3, wherein said tether member raises said hand grip above said flexible impermeable sheet to a height of approximately 12".

5. The motor vehicle snow and ice protective cover with handgrips as recited in claim 4, wherein said tether member is semi-rigid and resilient to enable it to bend when manipulated by the user and to return to the static upright position when released.

6. The motor vehicle snow and ice protective cover with handgrips as recited in claim 2, wherein said base comprises an upper retainer disposed above said flexible impermeable sheet and a lower retainer on the underside thereof to prevent tearing of the material at the connection point when in use or under duress due to updrafts.

7. The motor vehicle snow and ice protective cover with handgrips as recited in claim 6, wherein said lower retainer is magnetic and forms a magnetic bond between said flexible impermeable sheet and said vehicle to prevent the casual displacement thereof once in position and wherein said magnetic lower retainers are disposed on the underside of said reinforcement layer.

8. The motor vehicle snow and ice protective cover with handgrips as recited in claim 6, wherein said lower retainer is a suction cup and forms a vacuum bond between said flexible impermeable sheet and said vehicle front and rear windows to prevent the casual displacement thereof once in position and wherein said suction cups are disposed on the underside of said reinforcement layer.

9. The motor vehicle snow and ice protective cover with handgrips as recited in claim 1, wherein said plurality of fastener elements are situated at the front, rear and sides of said vehicle.

10. The motor vehicle snow and ice protective cover with handgrips as recited in claim 1, further comprising an elastomeric band encompassing the peripheral edges of said flexible impermeable sheet forming a lower elastic band to work in concert with said fastener elements to further deter updrafts of wind therein.

11. The motor vehicle snow and ice protective cover with handgrips as recited in claim 1, further comprising an elastomeric band encompassing the vehicle roof and windows forming an upper elastic band to work in concert with said fastener elements to further deter updrafts of wind therein.

12. The motor vehicle snow and ice protective cover with handgrips as recited in claim 1, further including a reinforced layer of material bonded to the underside of said flexible impermeable sheet.

13. The motor vehicle snow and ice protective cover with handgrips as recited in claim 1, wherein said handles are coated in glow paint for enhanced visibility in low light situations.

14. The motor vehicle snow and ice protective cover with handgrips as recited in claim 1, wherein said handles are infused with a chemiluminescent substance for enhanced visibility in low light situations.

15. A method of utilizing a snow and ice protective cover for motor vehicles to facilitate the removal of accumulated ice and snow therefrom during removal of said cover comprising the steps of:
    a) providing a flexible impermeable sheet shaped and sized to conform to the contours of a motor vehicle with a layer of reinforcement material bonded to the underside thereof, a plurality of fastener elements disposed around the periphery of the edges of said flexible impermeable sheet, a plurality of spaced apart handles disposed along the longitudinal meridian of said flexible impermeable sheet with each handle comprising a hand grip with a semi-rigid resilient tether extending downward therefrom to a base integral with said flexible impermeable sheet and each said base comprising an upper retainer disposed on the top surface of said flexible impermeable sheet and a magnetic retainer disposed on the underside of said reinforcement material for magnetic attachment to the vehicle's metal surfaces and suction cups for attachment to the front window and for attachment to the rear window and an elastomeric band integral with the peripheral edge of said flexible impermeable sheet;

b) placing said flexible impermeable sheet over said vehicle;
c) positioning the sides of said flexible impermeable sheet with said elastomeric band;
d) securing the peripheral edge of said flexible impermeable sheet to said vehicle with said fastener elements;
e) positioning the top of said flexible impermeable sheet with placement of said magnetic retainers and said affiliated handles to form a magnetic bond between said sheet and said vehicle and placement of said suction cups to a respective front and rear window;
f) allowing ice and snow to accumulate on said cover;
g) sequentially lifting each handle up to a clearance height of approximately 16" to urge said accumulated ice and snow to slide off said cover;
h) releasing said fastener elements;
i) releasing said elastic band from the underside of said vehicle and removing said cover therefrom; and
j) providing a storage pouch comprising:
  1) a body having one open end;
  2) a reinforced ring circumferentially encompassing said open end of said body;
  3) a drawstring disposed within said reinforced ring with the ends thereof of extending therefrom;
  4) a plurality of vent holes disposed within said body;
  5) firm rings disposed at a lower portion of said body;
  6) a sponge material associated with said firm rings;
  7) at least one drain with a plug disposed on a bottom portion of said body; and
  8) a plurality of legs disposed on the underside of said body.

16. The motor vehicle snow and ice protective cover with handgrips as recited in claim 15, wherein said handles have luminescent properties.

17. The motor vehicle snow and ice protective cover with handgrips as recited in claim 16, wherein said handles are coated in glow paint.

18. The motor vehicle snow and ice protective cover with handgrips as recited in claim 16, wherein said handles are infused in a chemiluminescent solution.

* * * * *